United States Patent
Izumi et al.

(10) Patent No.: US 11,512,782 B2
(45) Date of Patent: Nov. 29, 2022

(54) ACTUATOR AND EXHAUST VALVE DRIVING DEVICE

(71) Applicants: Jeco Co., Ltd., Saitama (JP); TOYOTA JIDOSHA KABUSHIKI KAISHA, Aichi (JP)

(72) Inventors: Hikoshi Izumi, Saitama (JP); Yoshiyuki Ariki, Saitama (JP); Taiki Miyokawa, Saitama (JP); Yuta Muneyoshi, Saitama (JP); Tomoki Mabuchi, Aichi (JP)

(73) Assignees: Jeco Co., Ltd., Saitama (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 231 days.

(21) Appl. No.: 16/916,652

(22) Filed: Jun. 30, 2020

(65) Prior Publication Data
US 2021/0071764 A1    Mar. 11, 2021

(30) Foreign Application Priority Data

Sep. 6, 2019   (JP) .............................. JP2019-163099

(51) Int. Cl.
*F16K 1/22*    (2006.01)
*F02D 9/04*    (2006.01)
*F16K 31/04*   (2006.01)

(52) U.S. Cl.
CPC ............... *F16K 1/221* (2013.01); *F02D 9/04* (2013.01); *F16K 31/043* (2013.01)

(58) Field of Classification Search
CPC .......... F02D 9/04; F02D 9/1065; F16K 1/221; F16K 31/043; F16K 31/535
See application file for complete search history.

(56) References Cited

U.S. PATENT DOCUMENTS

| 2008/0121489 A1 | 5/2008 | Chevalier |
| 2012/0264562 A1* | 10/2012 | Park ........................ F16K 31/05 475/331 |
| 2017/0175925 A1 | 6/2017 | Izumi et al. |
| 2018/0051611 A1* | 2/2018 | Hwang ..................... F01N 1/18 |

FOREIGN PATENT DOCUMENTS

| DE | 102016121184 | * | 5/2018 |
| JP | H03-083459 U | | 8/1991 |
| JP | 2008-531955 | | 8/2008 |
| JP | 2017-115617 | | 6/2017 |

OTHER PUBLICATIONS

Office Action dated Jan. 4, 2022 with regard to the corresponding Japanese patent application No. 2019-163099.

* cited by examiner

*Primary Examiner* — Phutthiwat Wongwian
*Assistant Examiner* — Diem T Tran
(74) *Attorney, Agent, or Firm* — IPUSA, PLLC (57) ABSTRACT

An actuator 1 includes a housing 2, an output shaft 3 protruding from the inside of the housing 2 to the outside, a motor 4 provided in the housing 2, and a reduction mechanism 5 that connects the motor 4 with the output shaft 3. The reduction mechanism 5 includes a worm gear, in which a worm 51 provided at a front end of a drive shaft 42 protruding from a main body 43 of the motor 4 and a worm wheel 52 rotating integrally with the output shaft 3 are engaged. A spindle 41 for increasing an inertia is provided between the worm 51 of the drive shaft 42 and the motor body 43.

3 Claims, 6 Drawing Sheets

ACTUATOR AND EXHAUST VALVE DRIVING DEVICE

CROSS-REFERENCE TO RELATED APPLICATIONS

The present application claims priority under 35 U.S.C. § 119 to Japanese Patent Application No. 2019-163099, filed Sep. 6, 2019, the contents of which are incorporated herein by reference in their entirety.

TECHNICAL FIELD

The present disclosure relates to an actuator and exhaust valve driving device.

BACKGROUND ART

Conventionally known is an exhaust valve driving device which is capable of switching an exhaust passage by opening and closing the exhaust valve provided in the exhaust passage of the engine (see, for example, Patent Document 0.1).

BACKGROUND ART DOCUMENT

[Patent Document 1]
Japanese Laid-Open Patent Application No. 2017-115617

SUMMARY OF INVENTION

Problem to be Solved by the Invention

Meanwhile, because an actuator for driving an exhaust valve in the exhaust valve driving device is located around an exhaust passage, it is preferable that the actuator be made as compact as possible for the convenience for an engine room space. In order to make the actuator compact, it is necessary to make a motor built in the actuator as a driving source compact. When the motor is made compact, the reduction ratio between the motor and the output shaft of the actuator must be relatively high to maintain the output torque of the actuator to be similar to that before making the motor compact. For example, in a case where the reduction mechanism uses a worm gear, the worm wheel is relatively large. Therefore, the engagement position of the worm provided on the drive shaft of the motor is apart from the motor body to necessitate an increase of the length of the drive shaft. However, because the drive shaft is thinned due to the compact ness of the motor, when the length of the drive shaft is increased, there may be a case where the drive shaft resonates due to engagement between the worm and the worm wheel so as to generate resonant sound.

The present disclosure has an object to provide an actuator and exhaust valve driving device capable of suppressing the resonant sound from generating.

Means for Solving Problem

An actuator according to one aspect of an embodiment of the present invention comprises a housing, an output shaft projecting from the interior of the housing to the exterior, a motor provided within the housing, and a reduction mechanism coupled between the motor and the output shaft, the reduction mechanism including a worm gear formed by engaging a worm provided at a distal end of a drive shaft projecting from a body of the motor and a worm wheel rotating integrally with the output shaft, wherein a weight for an inertia increase is provided between the worm of the drive shaft and the body of the motor.

Similarly, an exhaust valve driving device according to another aspect of an embodiment of the present invention includes the actuator described above and an exhaust valve connected to the output shaft and provided in an exhaust passage of an internal combustion engine.

Effect of the Invention

In accordance with the present disclosure, an actuator and exhaust valve driving device may be provided which can suppress resonant sound generation.

MODE OF CARRYING OUT THE INVENTION

Hereinafter, embodiments will be described with reference to the accompanying drawings. In order to facilitate the understanding of the description, the same elements in each drawing are, as far as possible, designated by the same reference numerals, and the overlapping description is omitted.

In the following description, the x direction, y direction, and z direction are perpendicular to each other. The x and y directions are typically horizontal and the z direction is typically vertical. For the purpose of illustration, the z positive direction side may be referred to as an upper side, and the z negative direction side may be referred to as a lower side.

Figure 1:
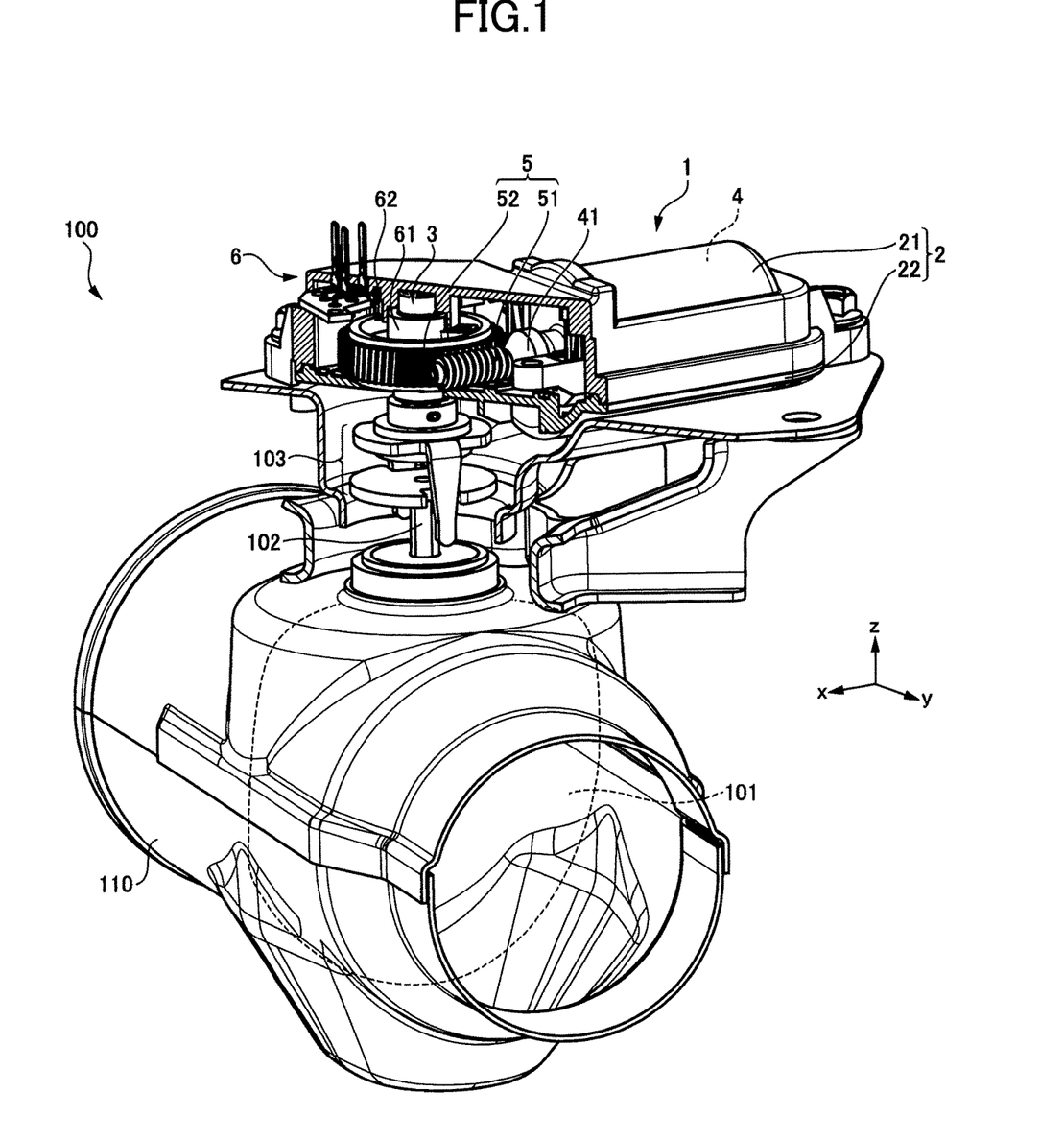
FIG. 1 is a perspective view of an exhaust valve driving device.

First, the exhaust valve driving device 100, to which the actuator 1 in accordance with the present embodiment is applied, will be described with reference to FIG. 1. FIG. 1 is a perspective view of an exhaust valve driving device 100. In FIG. 1, a portion of a housing on the front side of the paper surface is excluded to facilitate visualization of the internal structure of the exhaust valve driving device 100, and the boundary with the excluded portion is illustrated in cross-section.

The exhaust valve driving device 100 is a device that opens and closes an exhaust valve 101 provided in an exhaust passage 110 of an engine (internal combustion engine) to switch the exhaust passage such as switching a plurality of exhaust pipes or switching a collective mode in the case of a collective pipe. Thus, for example, the exhaust efficiency of an automobile and the charging efficiency of fresh air can be improved, and the exhaust note of the muffler can As illustrated in FIG. 1, the exhaust valve driving device 100 includes an exhaust valve 101, a rotation shaft 102 connected to the exhaust valve 101, and an actuator 1 for rotating the rotation shaft 102. The rotation shaft 102 of the exhaust valve 101 and the output shaft 3 of the actuator 1 are connected by a pair of connecting members 103, for example, illustrated in FIG. 1, so that the rotation of the output shaft 3 of the actuator 1 is transmitted to the exhaust valve 101.

In FIG. 1, the exhaust valve driving device 100 is disposed on the upper side (the z positive direction side) of the exhaust passage 110 of the engine, and a structure in which the rotation shaft 102 and the output shaft 3 are disposed in the z direction being the axial direction is illustrated.

Figure 2:
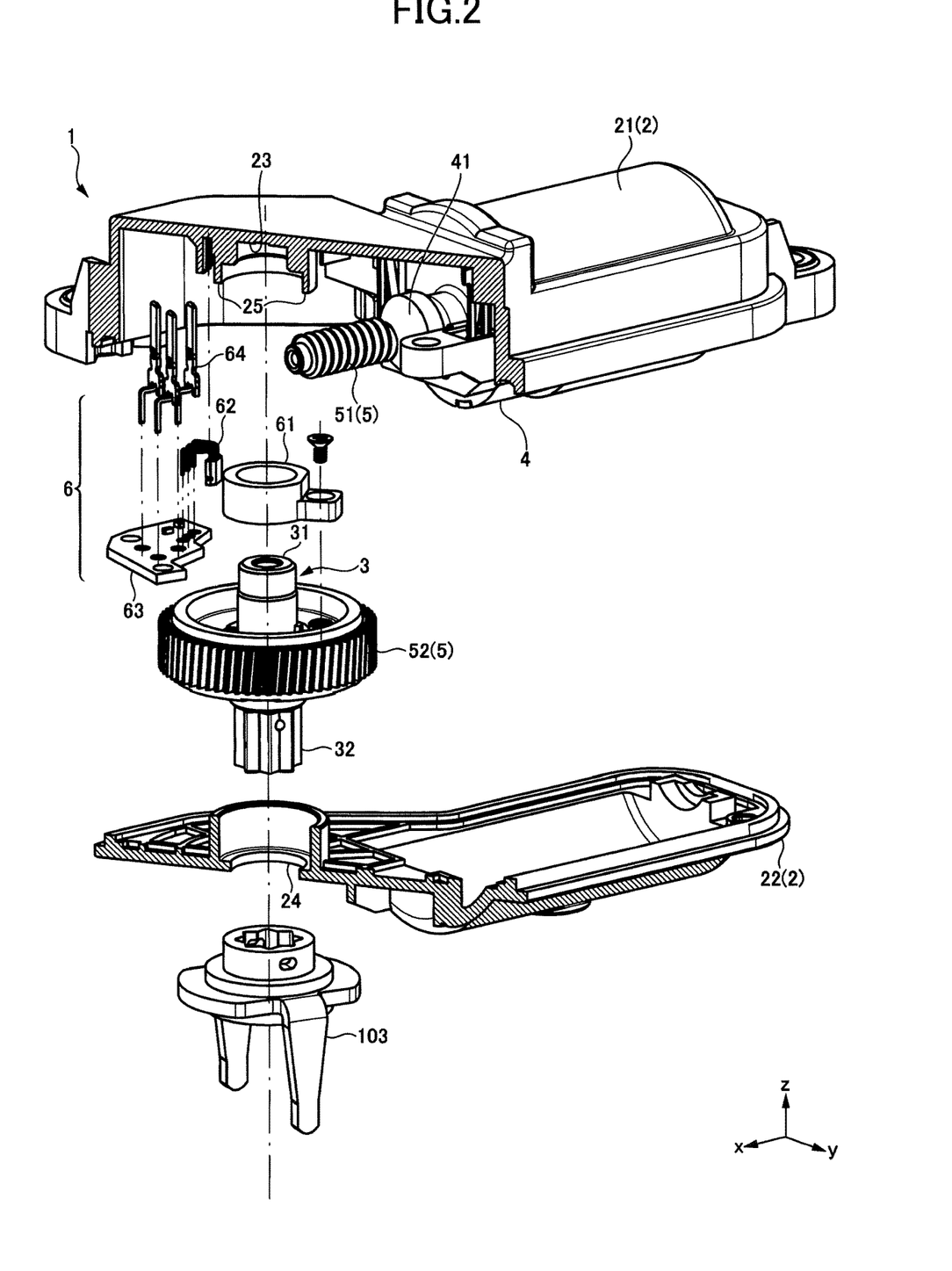
FIG. 2 is an exploded perspective view of an actuator in FIG. 1.

Referring to FIG. 2 in addition to FIG. 1, the structure of the actuator 1 will be described. FIG. 2 is an exploded perspective view of the actuator 1 in FIG. 1. In a manner similar to FIG. 1, in order to make the internal structure of the actuator 1 easier to be seen, a portion of the housing on the front side of the paper surface is excluded, and the boundary between the excluded portion and the housing is illustrated in cross-section.

The actuator 1 transmits the driving force of the motor 4 to the output shaft 3 through the reduction mechanism 5 and rotates the output shaft 3, thereby outputting the driving force from the output shaft 3 to a driven portion (in the present embodiment, the exhaust valve 101). As illustrated in FIGS. 1 and 2, the actuator 1 includes the housing 2, the output shaft 3, the motor 4 (a driving source), the reduction mechanism 5, and the tachometer side portion 6.

The housing 2 is made with an upper case 21 and a lower case 22, which are disposed opposite to an axial direction (the z direction) of the output shaft 3. In the example of FIGS. 1 and 2, the upper case 21 is disposed in the z positive direction side and the lower case 22 is disposed in the z negative direction side. The upper case 21 and the lower case 22 are made from, for example, resin material. The upper case 21 and the lower case 22 are joined while interposing a gasket or the like for waterproofing, and the motor 4, the reduction mechanism 5, and a part of the output shaft 3 are accommodated therein.

The motor 4 and the output shaft 3 are connected by the reduction mechanism 5 to transmit power. In this embodiment, the reduction mechanism 5 is a worm gear structured such that a worm 51 (a screw gear) provided in the drive shaft of the motor 4 and a worm wheel 52 (a helical gear) provided integrally with the output shaft 3 are engaged so that the directions of the rotation shafts of the worm gear and the worm wheel 52 is perpendicularly cross each other. In the example of FIGS. 1 and 2, the motor 4 is arranged so that the drive shaft extends in the x direction, whereby the worm 51 rotates around the rotation shaft along the x direction.

The rotation center of the worm wheel 52 is the axis center of the output shaft 3 and is formed concentrically on the outer side in the radial direction of the output shaft 3. That is, the worm wheel 52 rotates around the rotation shaft extending in the z direction. The worm wheel 52 and the output shaft 3 are integrally formed, for example, by insert molding the worm wheel 52 made from metal material with the output shaft 3 made with resin material.

When the motor 4 is driven to rotate by the reduction mechanism 5, the driving force of the motor 4 is transmitted from the worm 51 to the worm wheel 52, and the output shaft 3 rotates.

A bearing 23 is provided on the inner wall of the upper case 21, at which one end 31 of the output shaft 3 is supported in the z positive direction side. Meanwhile, an opening 24 is provided in the lower case 22, and the other end 32 of the output shaft 3 is exposed to the outside of the housing 2 from the opening 24 on the z negative direction side. The connecting member 103 described above is connected to the other end 32 of the output shaft 3.

The motor 4 is provided between the upper case 21 and the lower case 22 and is held so as to be interposed between the upper case 21 and the lower case 22. The worm 51 that engages the worm wheel 52 is provided at the end of the drive shaft of the motor 4. The motor 4 is rotated by a control device (e.g., an ECU of vehicle) provided externally to rotate the worm wheel 52 engaging the worm 51 and the output shaft 3.

The tachometer side portion 6 measures the rotation amount of the output shaft 3. The rotation amount of rotation includes at least one of the number of rotations, the angle of rotation, and the speed of rotation. The tachometer side portion 6 includes a magnet 61 provided to rotate integrally with the output shaft 3 and a Hall effect IC (a Hall element) 62 disposed oppositely outside the rotation locus of the magnet 61. The magnet 61 is configured such that the N and S poles are alternately arranged along the rotation direction of the output shaft 3. The Hall effect IC 62 is an alternating detection type Hall effect IC, in which the output voltage changes by detecting a change in polarity of the magnetic flux density (magnetic field applied to the TC by the magnet 61). The tachometer side portion 6 can measure the rotation amount of the output shaft 3 based on the detected value of the Hall effect IC 62. The number of the Hall effect ICs 62 is not limited to the structure of having one Hall effect IC 62 as illustrated in FIG. 2 but may be two or more. In this case, each Hall effect IC 62 is disposed along a circumferential wall 25 in a cylindrical shape.

The foot of the Hall effect IC 62 is electrically connected to a terminal 64 also connected to the substrate 63, as illustrated in FIG. 2.

These three terminals 64 protrude outwardly from the housing 2. By electrically connecting these terminals 64 to a control device such as an on-board ECU, the measured value of the Hall effect IC 62 can be obtained to derive the rotational amount of the output shaft 3. The controller can also control the drive of the motor 4 to bring the exhaust valve 101 to a predetermined opening degree based on the rotational amount of the output shaft 3.

Figure 3:
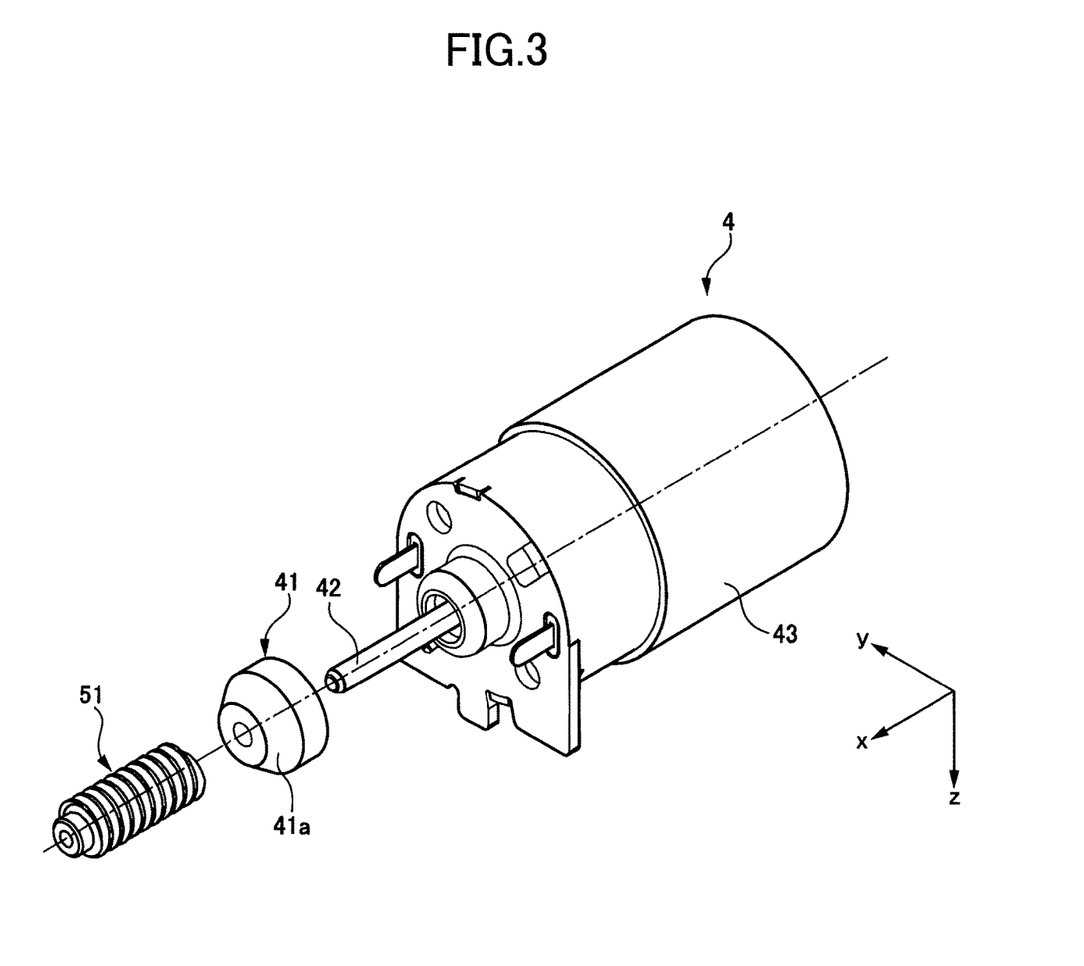
FIG. 3 is an exploded perspective view of a motor.
Figure 4:
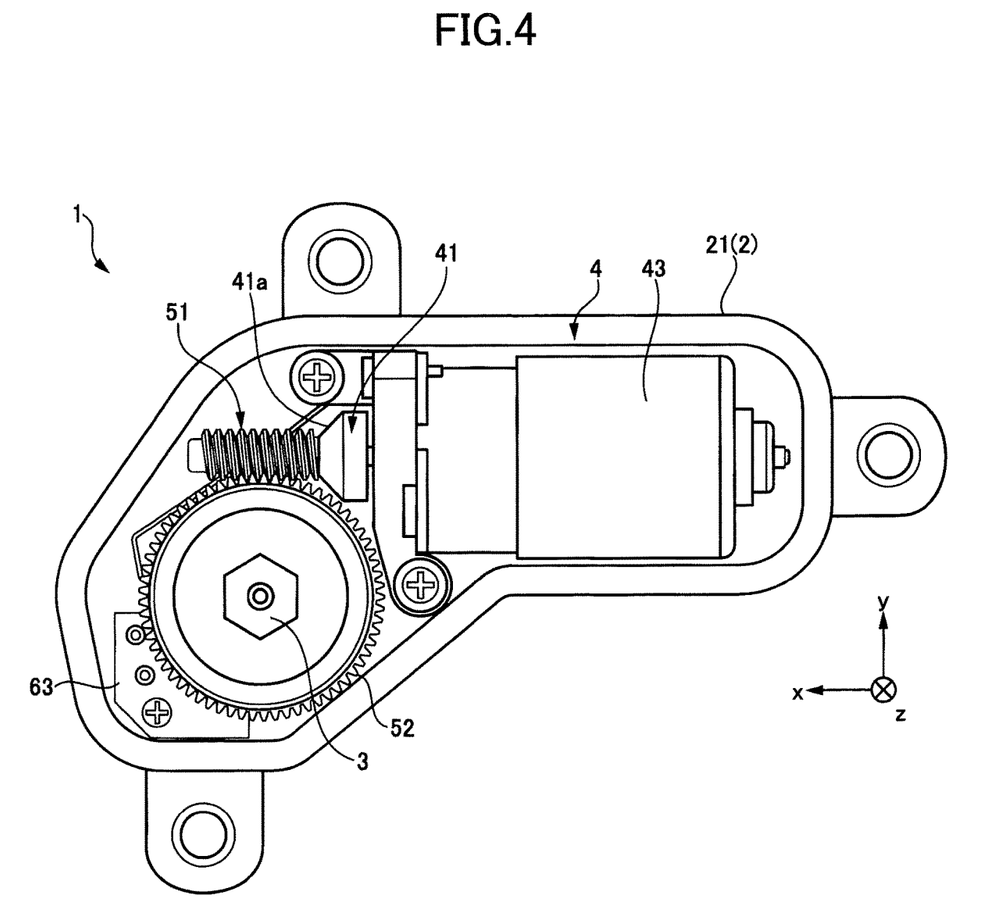
FIG. 4 is a plan view illustrating an internal arrangement of the actuator.

The structure of the motor 4 will be described with reference to FIGS. 3 and 4. FIG. 3 is an exploded perspective view of the motor 4. FIG. 4 is a plan view illustrating an internal arrangement of the actuator 1. FIG. 3 and FIG. 4 are both views viewed from the lower (z negative direction) side of FIG. 1 and FIG. 2.

As illustrated in FIGS. 3 and 4, the motor 4 includes a motor body 43 and a drive shaft 42 protruding in one direction (in the x direction) from the motor body 43. When the motor 4 is driven, the drive shaft 42 rotates and outputs driving force. As described above, the worm 51 of the reduction mechanism 5 (worm gear) is fixed to the drive shaft 42 so as to rotate integrally with the drive shaft 42 at the front end of the drive shaft 42.

In particular, in this embodiment, a spindle 41 for increasing inertia is provided between the worm 51 and the motor body 43 in the drive shaft 42 of the motor 4. The spindle 41 is formed concentrically with the drive shaft 42 and may have, for example, a cylindrical shape or a shape in which a conical surface 41a is provided so that the outer diameter on the side of the front end of the drive shaft 42 is gradually reduced in the cylindrical shape, as illustrated in FIGS. 3 and 4. The conical surface 41a is similar in shape to, for example, a circumferential surface of a truncated cone. Since the conical surface 41a is provided as described above, a space for disposing the worm wheel 52 can be secured as illustrated in FIG. 4, and the worm 51 can be disposed close to the side of the motor body 43. Therefore, the drive shaft 42 and the worm 51 can be shortened so as to make the actuator 1 compact.

The actuator 1, when applied to drive the exhaust valve 101 in the exhaust valve driving device 100, is installed around the exhaust passage 110, for example, as illustrated in FIG. 1. Therefore, it is preferable that the actuator 1 be made as compact as possible for the convenience of the space in the engine room. In order to make the actuator 1 compact, it is necessary to make the motor 4, which is built in the actuator 1 as a drive source of the actuator 1, compact. In order to maintain the output torque of the actuator 1 at the same level as that before making compact when the motor 4 is made compact, the reduction ratio between the motor 4 and the output shaft 3 of the actuator 1 needs to be relatively high. In a case where the reduction mechanism 5 according to the present embodiment is the worm gear, the worm wheel 52 is relatively large, so that the engagement position with the worm 51 provided in the drive shaft 42 of the motor 4 is separated from the motor body 43, thereby making the drive shaft 42 long. However, since the drive shaft 42 becomes thinner as the motor is made more compact. Therefore, if the drive shaft 42 is made long, the drive shaft 42 may resonate due to the engagement between the worm 51 and the worm wheel 52 so as to generate resonant sound.

Here, the mechanism by which the resonant sound (key sound) is generated during an operation of the actuator 1 will be described.

(1) First, in a case where the exhaust valve 101 is driven from the full open to the closed side in the exhaust valve driving device 100, the force of the return spring of the exhaust valve 101 is applied to the same as that of the driving direction of the actuator 1. Therefore, a situation occurs in which a load is scarcely applied to the engagement portion of the gear (worm wheel 52) of the reduction mechanism 5.

(2) The drive shaft 42 of the motor 4 may vibrate in a state in which a load is not applied to the engagement portion of the gears of the reduction mechanism 5 or in a state in which a light load is applied.

(3) The engagement portion of the worm 51 and the worm wheel 52 of the reduction mechanism 5 is driven by the rotation of the worm 51 while rubbing the tooth surface of the gear of the worm wheel 52.

(4) At the engagement portion of the worm 51 and the worm wheel 52, metal-to-metal sliding occurs. If the pressure in the engagement portion is low, the drive shaft 42 of the motor 4 is excitedly vibrated by the stick-slip phenomenon.

(5) When the excitedly vibrated frequency of the stick-slip phenomenon matches the resonant frequency of the drive shaft 42 of the motor 4, the drive shaft 42 resonates and a key sound is generated.

In view of the above-described generation mechanism, it is considered that resonant sound generation can be suppressed by intentionally shifting the resonant frequency of the drive shaft 42 of the motor 4. The resonant frequency can be changed by changing the inertia of the drive shaft 42. Accordingly, within the present embodiment, the drive shaft 42 of the motor 4 is configured to intentionally shift the resonant frequency by providing the spindle 41 for increasing the inertia so as to suppress the generation of resonant sound.

The material of the spindle 41 is, for example, brass. Since the inertia increases as the weight of the spindle 41 increases, the weight of the spindle 41 increases within the limit of the internal space of the housing 2. Preferably, the weight of the spindle 41 is such that the resonant frequency of the drive shaft 42 can be shifted by at least 2.7%. More preferably, the weight of the spindle 41 is such that the resonant frequency of the drive shaft 42 can be shifted by 3.9%, and more preferably, the weight of the drive shaft 42 can be shifted by 6.4%. The deviation amount of the resonant frequency may be adjusted by factors other than the weight, for example, the diameter of the spindle 41.

Figure 5:
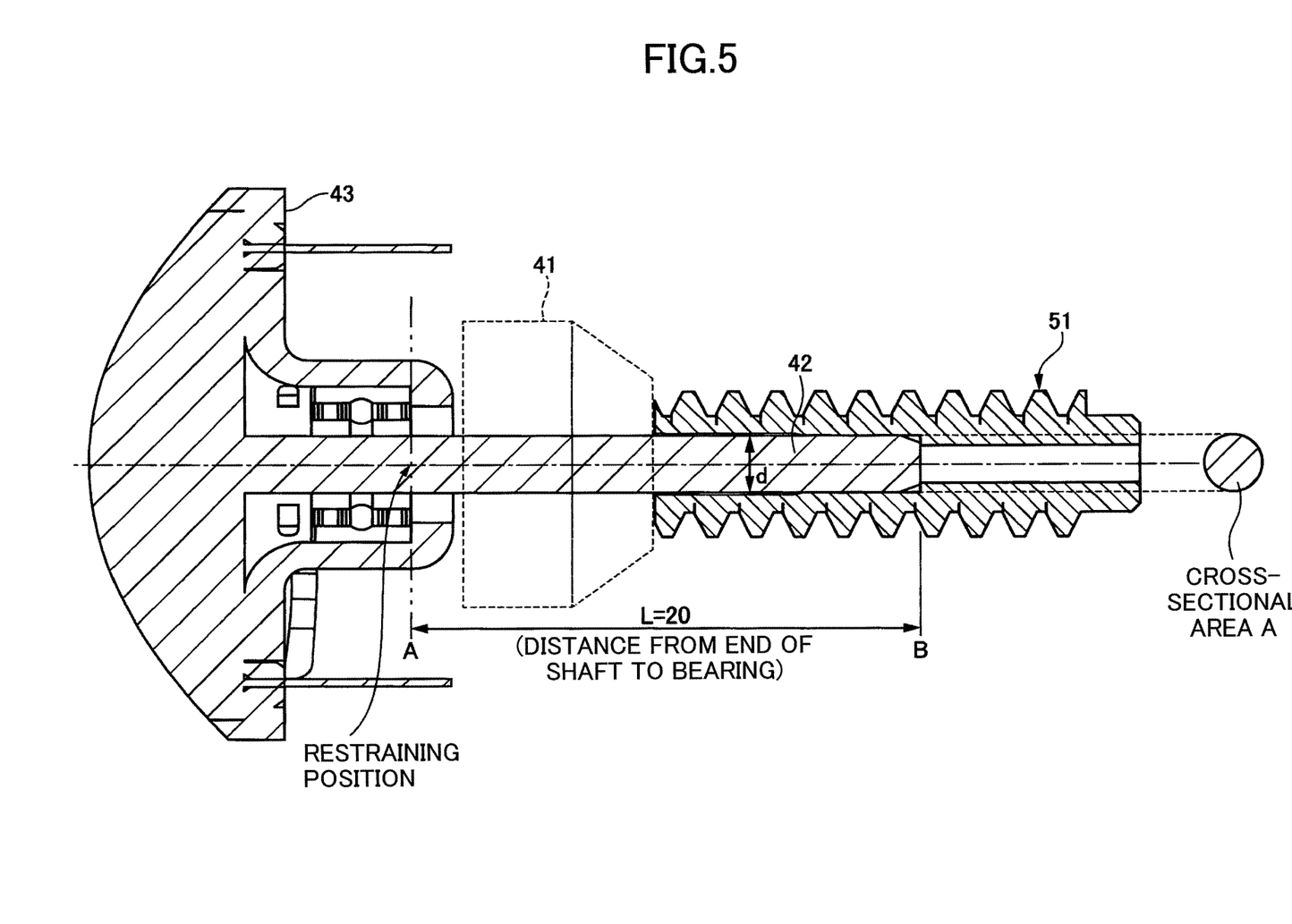
FIG. 5 is a schematic diagram illustrating conditions of simulating resonant sound generation.
FIG. E is a diagram illustrating a frequency analysis of simulation results.
Figure 6:
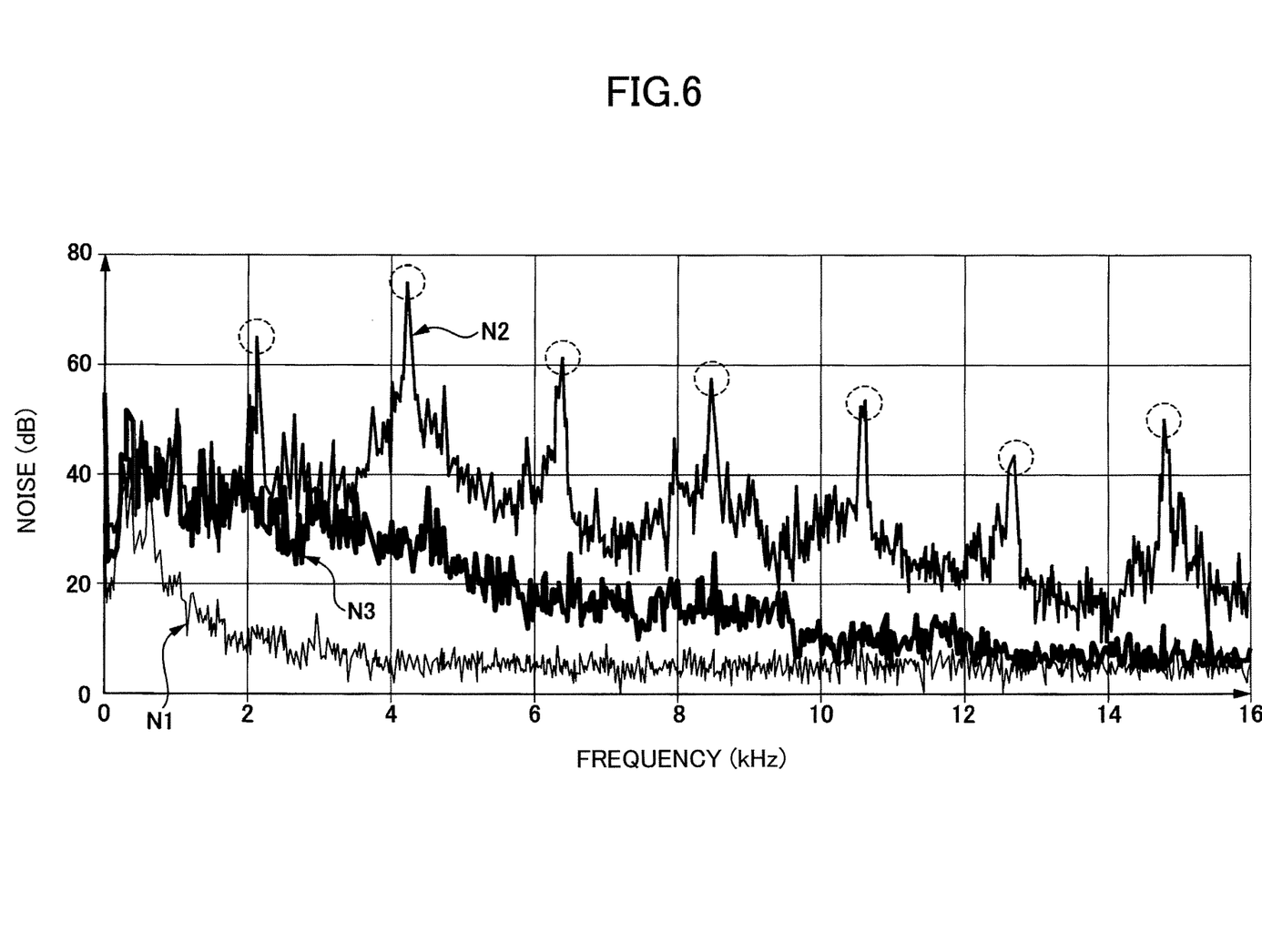

Referring to FIGS. 5 and 6, described is the simulation results of resonance generation in response to cases where the spindle 41 is present and not present. FIG. 5 is a schematic diagram illustrating the conditions of a resonant sound generation simulation. FIG. 6 is a diagram illustrating a frequency analysis of the simulation result.

As illustrated in FIG. 5, the natural frequency is checked in a configuration in which the spindle 41 is not disposed between the motor body 43 and the worm 51 (without the spindle), a configuration in which the spindle 41 is disposed, and in a case in which the spindle 41 is disposed, when the spindle is changed to three levels (the spindle A, B, and C). In the case of the structure having the spindle 41, the spindle 41 is disposed at a position between the motor body 43 and the worm 51 as illustrated using dotted lines in FIG. 5. As simulation conditions, a position A from which the drive shaft 42 protrudes outwardly from a bearing of the motor body 43 (a position represented by a double-dotted line in FIG. 5) is set as a fixed end of the drive shaft 42, and a contact position B between the front end of the drive shaft 42 and the inner wall of the worm 51 is set as a support end of the drive shaft 42. In other words, the boundary conditions were fixed-simple support.

Generally, the natural frequency f can be calculated by the following Equation (1).

[Math 1]

$$f = \frac{k^2}{2\pi}\sqrt{\frac{EI}{\rho AL^4}} \qquad (1)$$

Here, L is the distance from the position B at the front end of the shaft to the position A of the bearing, and it is set to be L=20 mm in the simulation. A is the cross-sectional area of the drive shaft 42, where A=2.25n, because the diameter d of the drive shaft 42 is set to be d=3 mm. $\rho$ is the mass density.

Here, the material of the drive shaft 42 is defined as SUS420, the mass density is defined as 7750 kg/m$^3$, the material of the worm 51 is defined as SUS303, and the mass density is defined as 7939 kg/m$^3$. E is the Young's modulus, and the Young's modulus of the drive shaft 42 is set to 200,000 MPa, and the Young's modulus of the worm 51 is set to 193,000 MPa. I is the cross-sectional second moment, where I=nd$^4$/64 because I is a circular cross-section. k is a dimensionless constant determined by the boundary conditions and a vibration mode, where k=3.927 when the boundary conditions are fixed-simple support. Further, the Poisson ratio of the drive shaft 42 is set to be 0.27 and the Poisson ratio of the worm 51 is set to be 0.29.

Table 1 shows the natural frequency calculated by the simulation.

TABLE 1

| SPECIFICATIONS | WITHOUT SPINDLE | SPINDLE A | SPINDLE B | SPINDLE C |
|---|---|---|---|---|
| DIAMETER OF SPINDLE (mm) | — | 11.5 | 13.0 | 13.0 |
| WEIGHT OF SPINDLE (g) | — | 4.6 | 5.6 | 6.5 |
| NATURAL FREQUENCY (Hz) | 2118.7 | 2061.7 | 2035.3 | 1982.7 |
| VARIATION OF NATURAL FREQUENCY (Hz) | — | 57.0 | 83.3 | 136.0 |
| DEGREE OF SECURITY | — | 1.00 | 1.46 | 2.38 |
| KEY SOUND GENERATION | x (PRESENT) | ○ (NOT PRESENT) | ○ (NOT PRESENT) | ○ (NOT PRESENT) |

As shown in Table 1, by installing the spindle 41, the natural frequency varies significantly from the case without the spindle so as to eliminate the key sound generation. In addition, it is known that the more weight of the spindle 41 increases in the order of the spindle A, the spindle B, and the spindle C, or the more diameter of the spindle 41, the more the variation of the natural frequency increases and the key sound generation is more securely prevented, said differently, the degree of security for suppressing the key sound is becomes higher.

FIG. 6 compares the results of frequency analysis of the noise generated in the cases where the spindle is not present and the spindle B is present in Table 1. The horizontal axis shows the frequency (kHz) and the vertical axis shows the noise level (dB) of each frequency. Graph N1 shows background noise, Graph N2 shows a case without spindle, Graph N3 shows the frequency characteristics of spindle B.

Without the spindle, graph N2 has a peak in integer multiples of the natural frequency (2.1187 kHz) as indicated by the dotted circle region, and a resonance due to resonance of the motor shaft is generated. On the other hand, when the spindle is present, the peak is absent when the spindle is not present, as shown in graph N3. Therefore, it is known that that resonant sound caused by the resonance is not generated. Accordingly, from the simulation results shown in Table 1 and FIG. 6, it is indicated that when the spindle 41 for increasing the inertia is provided in the drive shaft 42 of the motor 4 the resonance sound generation can be reduced.

Further, according to the present embodiment, the responsiveness (time constant) can be improved by providing the spindle 41 for increasing the inertia in the drive shaft 42 of the motor 4. This effect is described below.

First considered is the change in responsiveness when the actuator 1 is made compact. A conventional relatively large actuator is designated as a large actuator A, and the actuator that is made compact is designated as a compact actuator B. Hereinafter, the actuator is distinguished by these symbols A and B.

In the compact actuator B, the motor 4 is also made compact and the drive shaft 42 is also thinned. Therefore, the responsiveness of the motor 4 is differently performed from that of the conventional actuator A. In order to match the responsiveness of the compact actuator B with the responsiveness of the conventional large actuator A, an inertia target value Jd that can adjust the mechanical (speed) time constant of the motor 4 is obtained.

Generally, the mechanical time constant $T_M$ of the motor is expressed by Equation (2) below.

$$T_M = J \times Ra/(Kt \times Ke) \quad (2)$$

Where J is the motor inertia, Ra is the winding resistance, Kt is the torque constant, and Ke is the induced voltage constant.

The mechanical time constant $T_{MA}$ of the actuator A can be calculated using Equation (2) as follows.

$$T_{MA} = 4.26 \times 10^{-6} \text{ [kg·m}^2\text{]} \times 1.32[\Omega]/(2.19 \times 10^{-6} \text{ [V/rpm]} \times 60/2\pi \times 0.02 \text{(Nm/A)}) = 0.014 \text{ [sec]}$$

On the other hand, the mechanical time constant $T_{MB}$ of the actuator B can be calculated using Equation (2) as follows.

$$T_{MB} = 1.21 \times 10^{-6} \text{ [kg·m}^2\text{]} \times 1.45[\Omega]/(0.56 \times 10^{-6} \text{ [V/rpm]} \times 60/2\pi \times 0.01429 \text{ [Nm/A]}) = 0.008 \text{ [sec]}$$

That is, $T_{MB}/T_M = 0.008/0.014 = 0.571$, and the mechanical time constant $T_{MB}$ of actuator B is 42.9% faster than the mechanical time constant $T_{MA}$ of the actuator A. In order to adjust the mechanical time constant $T_{MB}$ of the actuator B to the mechanical time constant $T_{MA}$ of the actuator A, the adjustment with inertia is considered. The inertia target value Jd is expressed by Equation (3) below, since the mechanical time constant can be set to $T_{MA}$.

$$Jd = T_{MB} \times Kt \times Ke/Ra \quad (3)$$

Equation (3) using the same parameters as the above Equation (2), the inertia target value Jd can be calculated as follows.

$$Jd = 0.014 \text{ [sec]} \times 1.56 \times 10^{-6} \text{ [kg·m}^2\text{]} \times 60/2\pi \times 0.01429 \text{ [Nm/A]} 0.45[\Omega] = 2.057 \times 10^{-6} \text{ [kg·m}^2\text{]}$$

Within this embodiment, the spindle 41 brings the inertia of the motor 4 close to the target value Jd and brings the mechanical time constant $T_{MB}$ of the actuator B close to the mechanical time constant $T_{MA}$ of the actuator A. In this case, when using the spindle 41 in the shape illustrated in FIGS. 3 and 4 and the like as the brass material with the maximum diameter of the body side and the axial length of 7.15 mm, the inertia Jw of the spindle 41 is, for example, Jw=0.109× $10^{-6}$ [kg·m$^2$].

Assuming that the inertia of the spindle 41 of the actuator B is JB=1.21×10$^{-6}$ [kg·m$^2$], the inertia of the actuator B is JB+Jw=1.319×10$^{-6}$ [kg·m$^2$]. Therefore, in a case where the spindle 41 is provided, the mechanical time constant $T_{MBW}$ of the actuator B can be calculated as follows.

$$T_{MBW} = 1.319 \times 10^{-6} \text{ [kg·m}^2\text{]} \times 1.45[\Omega]/(1.56 \times 10^{-6} \text{ [kg·m}^2\text{]} \times 60/2\pi \times 0.01429 \text{ [Nm/A]}) = 0.00898 \text{ [sec]}$$

Therefore, $T_{MBW}/T_{MA} = 0.00898/0.014 = 0.64$, and the mechanical time constant $T_{MBW}$ of actuator B is 36% faster than the mechanical time constant $T_{MA}$ of actuator A. That is, it is improved by 6.9% compared to when the spindle 41 is not present.

Conventionally, when the motor is made compact to make the actuator compact, the responsiveness of the motor is changed. Therefore, the responsiveness control constant of a driver circuit which control the motor needs to be changed. When the driver circuit is changed, a cost for modifying the program incurs and the total cost becomes high.

On the other hand, within the present embodiment, when the motor 4 is made compact, the moment of inertia of the rotor decreases and the responsiveness becomes faster. Therefore, it is possible to adjust the responsiveness by increasing the moment of inertia by attaching the spindle 41 to the drive shaft 42 of the motor 4. Specifically, as described above, the responsiveness was improved by 6.9% compared to the structure without the spindle 41. As a result, the responsiveness is within an allowable range of the responsiveness control constant of the driver circuit, and the motor 4 properly works without changing the constant. As a result, even when the motor 4 is made compact for making the actuator 1 compact, in the exhaust valve driving device 100 according to the present embodiment, the conventional driver circuit is not changed but the actuator 1 can be reassembled so as to be changed. Therefore, it is possible to reduce the cost for making the actuator compact.

As described above, this embodiment has been described with reference to the specific examples. However, the present disclosure is not limited to these specific examples. These specific examples, to which the design has been appropriately modified by those skilled in the art, are also included in the present disclosure as long as they possess the features of the present disclosure. The elements provided in each of the embodiments described above, and the arrangement, conditions, shape, and the like thereof, may be adapted and modified from time to time without being limited to those exemplified. Each element provided by each of the above-described embodiments may vary in combination as appropriate, unless there is a technical inconsistency.

DESCRIPTION OF SYMBOLS

1 Actuator
2 Housing
3 Output shaft
4 Motor (Drive source)
41 Spindle
42 Drive shaft
43 Motor body
5 Reduction mechanism
51 Worm
52 Worm wheel
6 Tachometer side portion
100 Exhaust valve driving device
101 Exhaust valve

What is claimed is:

1. An actuator comprising:
   a housing;
   an output shaft protruding from the interior of the housing to the exterior;
   a motor provided in the housing, and
   a reduction mechanism connecting the motor and the output shaft,
   a resonant frequency changer configured to suppress resonance sound by changing a resonance frequency of a drive shaft protruding from a main body of the motor;
   wherein the reduction mechanism includes a worm gear configured such that a worm provided at a front end of the drive shaft and a worm wheel rotating integrally with the output shaft are engaged with each other, and
   wherein the resonant frequency changer is a spindle for increasing the inertia, the spindle being fixed between the worm and the main body of the motor.

2. The actuator according to claim 1, wherein the spindle is configured to shift the resonant frequency of the drive shaft by 2.7%.

3. An exhaust valve driving device comprising:
   the actuator according to claim 1; and
   an exhaust valve connected to the output shaft and provided in an exhaust passage of an internal combustion engine.

* * * * *